United States Patent [19]

Rother

[11] 3,914,558

[45] Oct. 21, 1975

[54] CIRCUIT ARRANGEMENT FOR MULTIPLE FREQUENCY CODE CHARACTER RECEIVERS IN TELECOMMUNICATION SYSTEMS

[75] Inventor: Klaus Dieter Rother, Planegg, Germany

[73] Assignee: Siemens Aktiengesellschaft, Berlin & Munich, Germany

[22] Filed: July 23, 1973

[21] Appl. No.: 381,614

[30] Foreign Application Priority Data

July 26, 1972 Germany ........................... 2236781

[52] U.S. Cl. ............................................ 179/84 VF

[51] Int. Cl.² ............................................ H04M 1/00

[58] Field of Search ...................... 179/84 VF, 2 DP

[56] References Cited

UNITED STATES PATENTS

| | | | |
|---|---|---|---|
| 3,288,940 | 11/1966 | Bennett et al. | 179/84 VF |
| 3,293,371 | 12/1966 | Burns et al. | 179/84 VF |
| 3,582,562 | 6/1971 | Sellari | 179/18 AD |

*Primary Examiner*—Kathleen H. Claffy
*Assistant Examiner*—Joseph Popek

[57] ABSTRACT

Circuit arrangement for multiple frequency code character receivers in telecommunication systems, more particularly telephone installations with additional data traffic. Differentiation of characters which are composed of one pair of audio frequencies and, of two rapidly succeeding pairs of audio frequencies by means of a two-stage time switch which is rendered operative at the beginning of each pair of frequencies, whereby a character of the second category is identified if a first time threshold is reached twice in succession. The presence of a character of the first category is indicated if a second threshold of time is reached.

2 Claims, 1 Drawing Figure

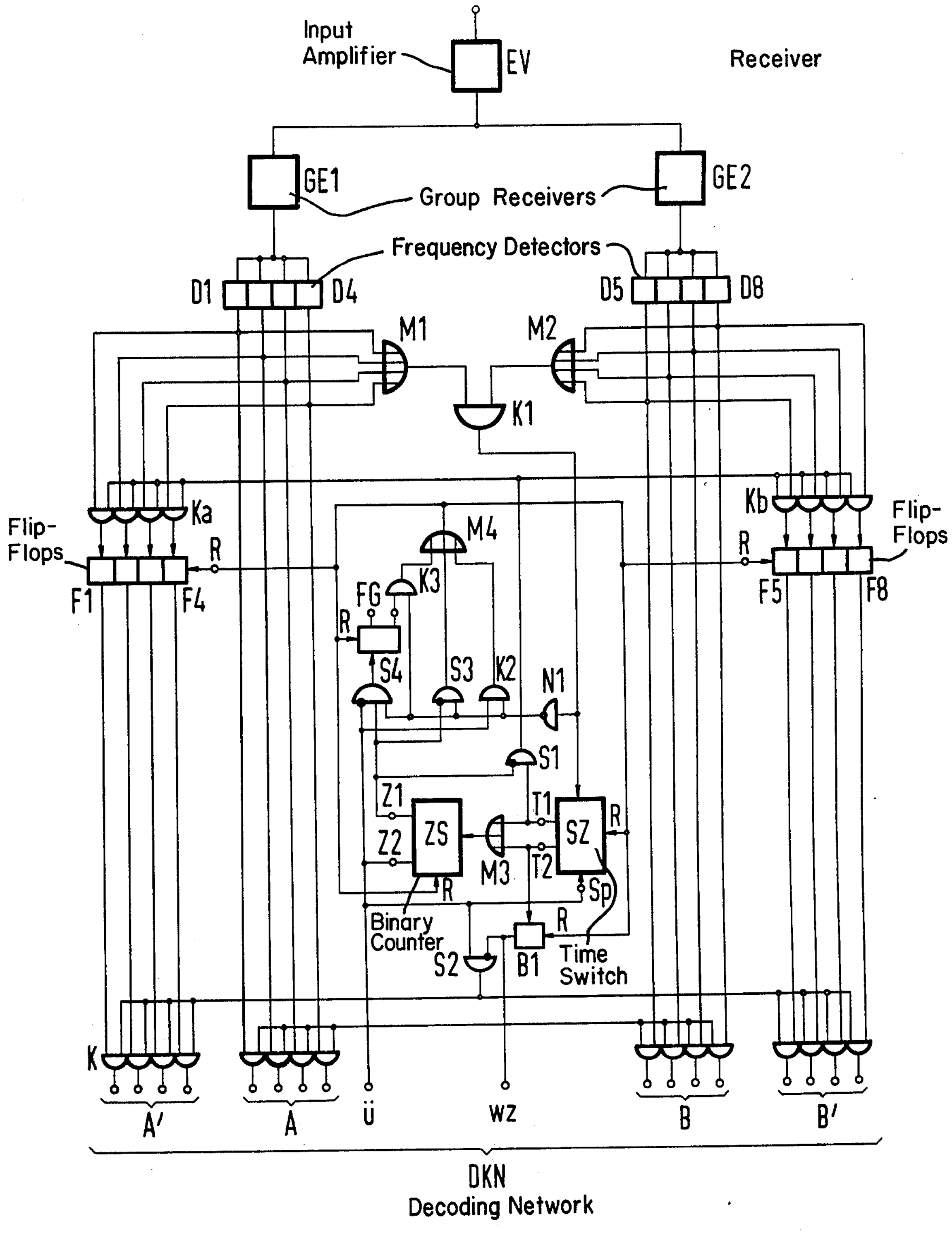
Input
Amplifier
EV
Receiver
GE1
Group Receivers
GE2
Frequency Detectors
D1
D4
D5
D8
M1
M2
K1
Ka
Kb
Flip-
Flops
R
F1
F4
F5
F8
M4
K3
FG
S4
S3
K2
N1
S1
Z1
Z2
ZS
M3
T1
T2
SZ
Sp
Binary
Counter
S2
B1
Time
Switch
K
A′
A
ü
wz
B
B′
DKN
Decoding Network

CIRCUIT ARRANGEMENT FOR MULTIPLE FREQUENCY CODE CHARACTER RECEIVERS IN TELECOMMUNICATION SYSTEMS

BACKGROUND OF THE INVENTION

A commonly used data transmission technique is to employ existing telephone lines for supplementary data traffic. More particularly, it is a well-known technique to utilize existing telephone sets with multiple frequency code signaling as terminal stations for the data traffic. However, measures must be taken in order to be able to distinguish dial code signals from data characters and to have available an adequate number of characters for the data traffic.

A well-known technique for the formation of the characters in order to solve the foregoing problem is to form the data characters from two consecutive pairs of audio frequencies. Thus, with the use of the normal two frequency groups having four frequencies each, a total of 64 or 256 characters are possible, depending on whether only the frequencies of either one or both frequency groups change when passing to the second signal element or data character. Such a procedure for forming characters is fully compatible with the use of multiple frequency code signaling normally employed in dial telephone systems, when characters having identical meanings are each composed of two identical pairs of audio frequencies.

Taking the foregoing discussion as a basis, the invention relates to a circuit arrangement for multiple frequency code character receivers in telecommunication systems, more particularly telephone installations with additional data traffic, wherein characters of a first category shall be received from one pair of audio frequencies and characters of a second category from two rapidly succeeding pairs of audio frequencies.

An object of the invention is to provide a receiver capable of recognizing and distinguishing data characters and dial code signals positively and without great expenditure in components.

SUMMARY OF THE INVENTION

In accordance with the invention, the foregoing and other objects are achieved in that order to distinguish the two categories of characters a two-stage time switch is provided which is reconnected into the circuit at the start of each pair of audio frequencies. The presence of a character to be evaluated is identified if a first threshold of time is reached and if this first threshold of time is reached twice in succession the presence of a character of the second category is indicated, while the reading of a second threshold of time indicates the presence of a character of the first category.

The two-stage time switch makes use of the fact, in a manner in itself known, that true characters invariably have a minimum time interval. This minimum time interval is differently selected, assuming that in the two categories of characters the duration of the push button operation for the purpose of emitting a character is substantially the same and corresponds in the half cycle to the first threshold of time and in characters of the first category to the second threshold of time. These different thresholds of time enable one in a simple manner to distinguish between the two types of characters if there is adequate speech immunity and the time switch is restarted at the beginning of each pair of audio frequencies. The start of a pair of audio frequencies can be determined either by a change of audio frequency and/or by termination of a character gap. Since, as a rule, each change of frequency is accompanied by a short-time interruption of the group coincidence, such supervision is adequate in many cases. The restart of the time switch during the second half character pulse has the advantage, in comparison with solutions with release-delayed demodulators for bridging the transition from the first to the second subcharacter and with continuous time of protection from the start of the character, that no great demands are made on the switching devices in the transmitter. Further, in telephone installations using characters of the first category for dial code signaling and characters of the second type for additional data traffic the possibility is offered to distinguish in a simple way between dial code signals and data signals, so that the receiver is independent of the type of the connected transmitter station.

An advantageous form of construction is characterized by the fact that a two-stage counting device is coupled to the time switch and is advanced when the individual thresholds of time are reached, the currently queuing character portion being stored intermediately by activating the first counter stage, the evaluation of the received character being allowed to take place and the time switch being disabled by activating the second counter stage.

BRIEF DESCRIPTION OF THE DRAWING

The principles of the invention will be more readily understood by reference to the description of a preferred embodiment given hereinbelow in conjunction with the Single FIGURE Drawing which illustrates the preferred embodiment in schematic diagram form.

DETAILED DESCRIPTION OF THE DRAWING

The upper portion of the Figure shows the essential units of a receiver for characters according to (2x 1 out of 4) code and comprising an input amplifier EV, the two group receivers GE1 and GE2 with the following frequency detectors D1 to D4 or D5 to D8. This receiver construction is known as is the construction of each of its components.

The outlets of these individual frequency detectors are connected in the known manner to a following decoding network DKN through coincidence gate K. Furthermore, the outputs of the individual frequency detectors are connected as a unit with binary storage elements, e.g. flip-flop circuits F1 to F4 or F5 to F8, over coincidence gate K*a* or K*b*. These flip-flop circuits store, in the case of characters consisting of two consecutive pairs of audio frequencies, signals corresponding to the first pair of audio frequencies, and the outputs of the flip-flops are, likewise, connected to decoding network DKN over coincidence gate K. In the center of the Figure there is further shown a logic evaluating circuit, the main elements of which are a two-stage time switch SZ having outlets T1 for the first threshold of time and T2 for the second threshold of time, as well as a two-stage binary counters ZS having two outputs Z1 and Z2.

The mode of operation of the illustrated arrangement is as follows: A character in the form of a pair of audio frequencies and queuing at the input of the receiver results, as is known, in output signals at each of the frequency detectors of the groups D1 to D4 and D5 to D8. The logic elements M1 and M2 monitor the appearance of these signals and generate, at the start of every audio frequency signal, a control signal at the output of the coincidence gate K1. This signal which reappears with each pair of audio frequencies renders the two-stage time switch SZ operative. This time switch is constructed in the known manner such that at any given moment when the time thresholds T1 and T2 are reached a short control pulse is emitted at the corresponding outputs. An example of a prior art element suitable for use as the time switch SZ will be found by reference to U.S. Pat. No. 3,668,319, and particularly Figure 9*e* therein. These control pulses advance step by step the following counter ZS over the gate M3, whereby the counter position reached at any given moment is identified by a continuous signal at the associated output Z1 or Z2. If the output Z1 of the counter does not contain a signal, then the control pulse appearing at the output T1 of the time switch brings about the temporary storage of the queuing pair of signals by opening the coincidence gate K*a* or K*b* over the gate S1.

A signal at the output Z2 of the counter ZS indicates that independently of the category of the received character the recognition is terminated and the decoding network DKN can be activated, which is indicated by an instruction at the outlet *u*. At the same time, the time switch SZ is disabled so that after exceeding the time threshold T1 the threshold of time T2 cannot also be exceeded by mistake. The decision as to whether a character of the first or second category has been received is reached by means of the flip-flop circuit B1 and the gate S2. The flip-flop circuit B1 is switched to the operating position each time upon passing through the second threshold of time T2 and indicates therewith via the ouput Wz that there is a character of the first category, e.g. a dial code signal. At the same time, the gate S2 is disabled so that the coincidence gates K for the subgroups A′ and B′ are not released. The signal queuing at the output of the individual frequency detectors D1 to D8 can reach directly the decoding network DKN only via the outputs of the coincidence gates for the subgroups A and B, while the signals stored intermediately in the flip-flop circuits F1 to F8 are not evaluated. If the flip-flop circuit B1 has not been set, this is a sign that the time threshold has not been reached and the counter has only been advanced by signals at the output T1. In this case, the gate S2 is not disabled so that upon connecting the stage Z2 of the counter into circuit the coincidence gate K of all four subgroups A′, A, B and B′ are opened.

The particular end of the output signal at the coincident gate K1 is monitored by means of the NOT gate N1. If the counter stage Z2 has been reached previously, then, over the coincidence gate K2 and the OR gate M2, all elements which are in the working position are switched to the rest position over their terminals R, thereby preparing the receiver for accepting a new character.

Further logic elements are provided so as to rule out the possibility that an ongoing evaluation can be falsified by interference pulses. If, for example, the output signal at the coincidence gate K1 ends before the time threshold T1 has been reached, then this is an indication that there is trouble somewhere. The gate S3 causes a counter reset over the OR gate M4. The counter is likewise reset if in the case of half cycle characters a signal apppears at the output of NOT gate N1 before, and after the start of the second half cycle, the time threshold T1 is reached again and thereby the counter stage Z2 of the counter ZS is rendered operative. To achieve this purpose, an additional two-stage counter ZS is advanced over the gate S4 at the output of the negator N1 with each new signal, after the counter stage Z1 is reached. Thus, the signal likewise brings about a counter reset at the outlet of the NOT element N1 over the coincidence gage K3 after the final position has been reached.

The receiver circuit illustrated in the drawing represents an embodiment which admits of a large number of variations without departing from the scope and spirit of the invention. This is particularly true with regard to the connection of the signals T2 and Z2 and the selection of the intermediate storage elements F1 to F8. Instead of characters of the second category, wherein a change of frequency occurs in the two frequency groups, characters may also be received wherein a change of frequency only takes place in one or the other of the two frequency groups. In this case, the continuance of the frequency of the unchanging frequency group would have to be supervised, for instance, by connecting the output of the OR gate M4 at the same time to an inlet of the OR gate M4 if a frequency change may solely occur in the group. It is also possible in the case of characters of the first category to use all four subgroups A, A′, B and B′ for the identification, which can be fixed selectively.

I claim:

1. Apparatus for multiple frequency code character receivers having a plurality of frequency detectors and used in telecommunication systems characters of a first type are received from a pair of audio frequencies and characters of a second type are received from two pairs of rapidly succeeding audio frequencies, comprising:

first switching means for monitoring the beginning of each pair of audio frequencies, said first switching means being coupled, respectively, to outputs of said frequency detectors, time switch means, operable responsive to said first switching means, for determining the duration of each pair of audio frequencies and for producing a first output signal at the end of a first predetermined threshold of time and a second output signal at the end of a second predetermined time threshold, second switching means coupled to outputs of said time switch means for determining the attainment of said second time threshold and the second successive attainment of said first time threshold, buffer storage means, said second switching means connecting the outputs of said frequency detectors to said buffer storage means upon the first attainment of said first time threshold and interpreting means, operable responsive to the second successive attainment of said first time threshold, for receiving the contents of said buffer storage means and the instantaneous output of said frequency detectors as characters of said second type, and, operable responsive to attainment of said second time threshold, for receiving the instantaneous outputs of said frequency detectors as characters of said first type.

2. The apparatus defined in claim 1 further comprising a two stage counting means coupled to said time switch means, said counting means being advanced upon attainment of said individual time thresholds, said counting means having a control output from the first stage thereof for causing the intermediate storage of the outputs of said frequency detectors and a control output from the second stage thereof for disabling said time switch means and causing the transfer of the outputs of said frequency detectors to said interpreting means.

* * * * *